INVENTOR.
Austin A. Knox
BY
Blair Buckles + Cesari
ATTORNEYS

United States Patent Office 3,445,116

Patented May 20, 1969

3,445,116

TAPE RECORDER/REPRODUCER

Austin A. Knox, Stamford, Conn., assignor to Medical Data Services Inc., Darien, Conn.

Filed June 6, 1966, Ser. No. 555,468

Int. Cl. G11b *5/86*

U.S. Cl. 274—4 7 Claims

ABSTRACT OF THE DISCLOSURE

Magnetic recording tape transport and transducing assembly having a pivoting cartridge tray for positioning a tape loop adjacent the transducer and between the capstan and pinch roller. The cartridge tray has an interlock for holding the tray in positive engagement for operation or removal of the tape cartridge. An interlock also prevents tray movement until the cartridge is fully inserted therein. Cam mechanism is provided to change the relative positions of the tape guide and transducer for multi-track recording tape.

This invention relates to a tape recorder/reproducer and more particularly to a tape transport and transducer apparatus for a continuous loop recording tape cartridge.

A continuous loop tape cartridge comprises a tape mass wound around a hub wherein a tape loop is pulled from the innermost turn of tape adjacent the hub, passing along a side of the cartridge having appropriate openings for engaging a tape transport and transducer arrangement, and then is wound around the outside of the rotating tape mass. A problem in prior art tape machines has been in providing for the engagement of the tape loop between a driving capstan and pinch roller. One approach has been to provide a self-contained pinch roller in each cartridge, journaled in the cartridge interior and bearing against the exposed tape loop for engagement with a capstan when the tape cartridge is urged against the capstan. The inclusion of a pinch roller in each cartridge, of course, adds substantially to the cost of the cartridges and it usually sets a cost limit on the quality of the plastic or elastomeric materials used in making the pinch roller. Such inferior materials tend to "set" or deform when the machine is idle with the pinch roller engaged, to the extent that reproductive quality is deleteriously affected when the tape transport is run.

Another prior art attempt in engaging a tape transport with a continuous loop recording tape cartridge has been the provision of a "disappearing" pinch roller which is moved up inside the tape cartridge in an arcuate path through a hole in the cartridge base such as shown in U.S. Patent No. 2,876,005. This approach has several disadvantages. First of all, each cartridge must have a substantial amount of free space in it to accommodate the pinch roller and its positioning mechanism and the cartridges are unnecessarily bulky. Further, the cartridge base requires a large hole for entry of the pinch roller which permits dust and dirt to gather in the cartridge. A problem at least equally important with such a disappearing pinch roller is that it is virtually impossible to maintain parallelism between the axis of the capstan and the axis of the pinch roller since the pinch roller is moved in an axial arc toward and away from the capstan. Thus, if the pinch roller axis is tilted with respect to the capstan axis more or less pressure will be applied on the top or bottom of the recording tape as it is pulled through the tape transport system. Such unevenness of pressure from the pinch roller causes tape wander, i.e., vertical movement of the tape up or down the capstan, resulting in tracking problems and/or loss of reproductive fidelity.

Another problem with prior art continuous loop tape cartridges wherein the pinch roller is positioned in the cartridge during playing, results from the driving of the tape on its oxide side with the oxide side adjacent the capstan. Since the capstan is supplying the motive power, and in many instances is etched or roughened, tape wear is increased. Accordingly it is desirable to drive the tape on its non-oxide side to increase tape life.

Another problem of prior art continuous loop recording tape cartridges is that there has been no provision for compensating for the difference in travel of the top and bottom of the tape as it is pulled from around the cartridge hub, turned to lie flat over the tape mass and then is righted again to be pulled across the transducer by the tape transport apparatus. This turning of the tape to make it lie flat over the tape mass results in greater tension along one edge of the tape, and unless this increased tension is compensated for it will affect the pressure of the tape against the transducer head and accordingly, will affect fidelity of reproduction. As will be understood by those skilled in the art, this is particularly important with multi-track stereo tapes.

Further, prior art machines have been difficult to load or otherwise are inappropriate for general consumer use since they do not provide for easy loading and/or protection of the tape cartridge or the machine against inadvertent damage by the consumer. Still other problems have arisen in providing for the playing of multi-track tapes, the apparatus for positioning the transducer head or heads relative to the tape being costly due to the relatively high precision required in positioning the transducer head on the tape.

Many prior art machines are also subject to breakdown, loss of tracking, or poor reproductive qualities because of vibration and shock. Even machines that have been designed for use in automobiles have not been completely satisfactory from this standpoint.

Accordingly it is an object of this invention to provide a recorder/reproducer machine for continuous loop recording tape cartridges having improved tape transport apparatus.

Another object of the invention is to provide a machine of the above character wherein a tape cartridge may be easily inserted, engaged and disengaged by the tape transport apparatus.

A further object of the invention is to provide a machine of the above character wherein the contact between the transducer head and information track or tracks is improved.

Another object of the invention is to provide a machine of the above character wherein the tape cartridge is held by a movable tray wherein the movement of the tray positions the tape loop for engagement and disengagement with the tape transport and transducer apparatus.

A further object of the invention is to provide a machine of the above character having an improved operating control linkage for engaging, disengaging and positioning of the tape by the tape transport and transducer apparatus.

Another object of the invention is to provide a machine of the above character wherein the relative position of the transducer head with respect to the tape may be accurately changed.

A further object of the invention is to provide a machine of the above character which is relatively economical to manufacture.

Another object of the invention is to provide a machine of the above character which is adapted for use in an automobile.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Similar reference characters refer to similar parts throughout the several views of the drawings.

Figure 1:
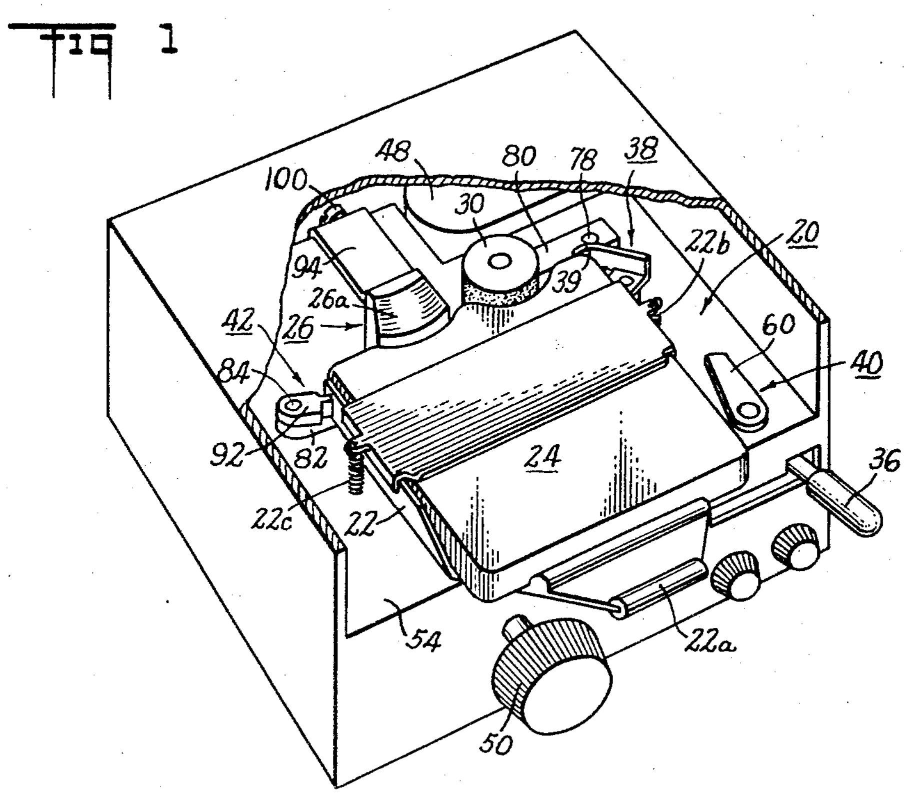
FIGURE 1 is a perspective view partially broken away of the recorder/reproducer of my invention having engaged therewith my continuous loop recording tape cartridge.
Figure 3:
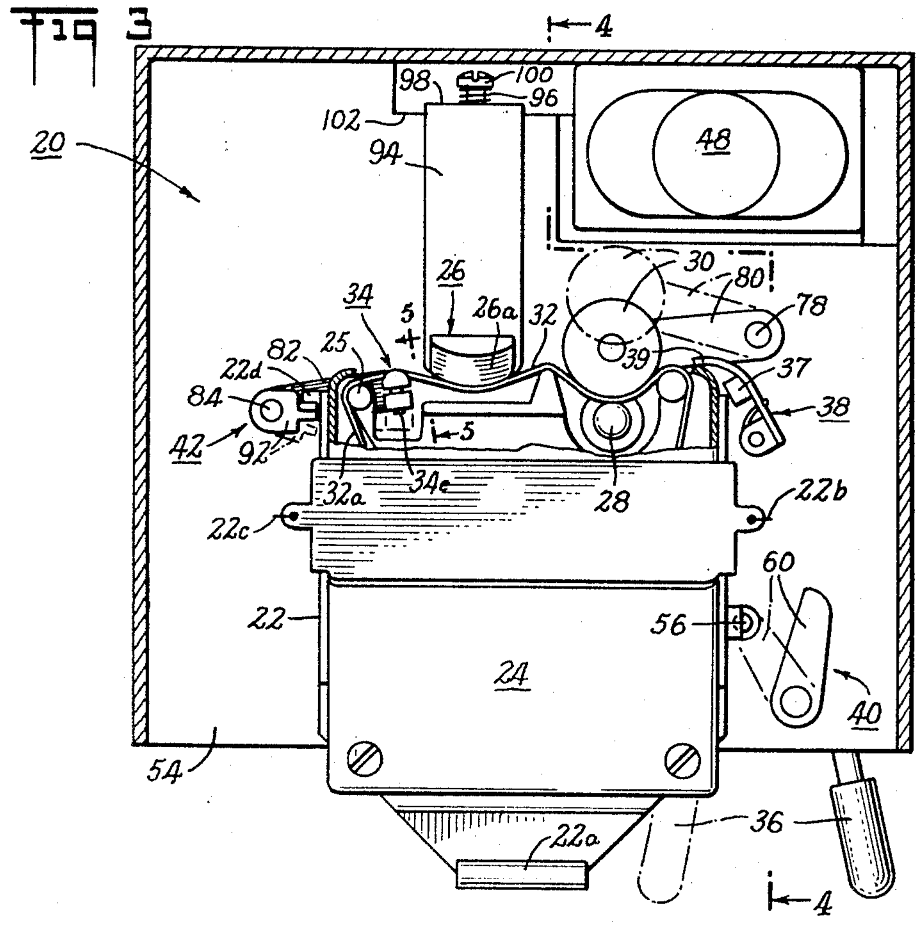
FIGURE 3 is a top view in partial section showing the tape transport and transducer arrangement of the recorder/reproducer of my invention and with a tape cartridge engaged therewith.
Figure 4:
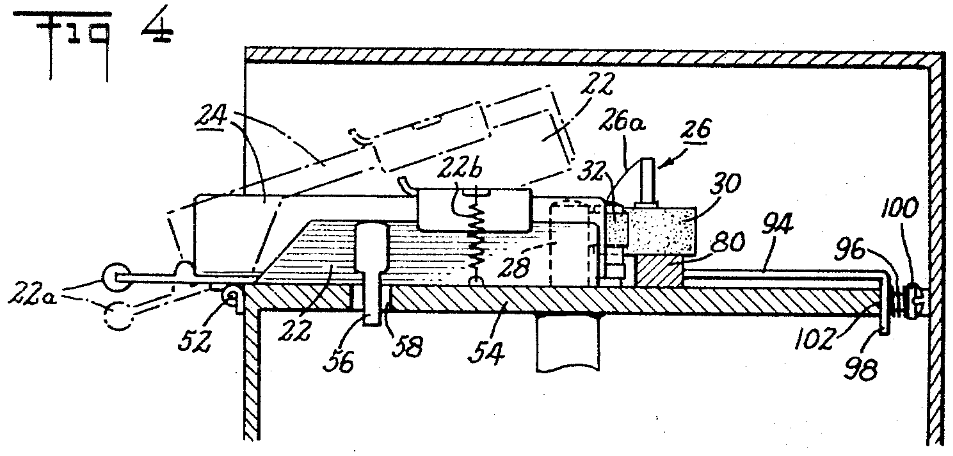
FIGURE 4 is a side sectional view taken along lines 4—4 of FIGURE 3.

Referring now to FIGURES 1, 3 and 4, the tape recorder/reproducer machine of my invention comprises a tape deck generally indicated at 20 having a hinged tilting tray 22 for holding a continuous loop tape cartridge 24 for engagement and disengagement with transducer head 26 as the tape is moved by the tape transport. As best seen in FIGURE 3, the capstan 28 and pinch roller 30 engage the tape loop 32 for moving of the tape past the transducer head, with the capstan inside, i.e., on the nonoxide side, of the tape.

Figure 2:
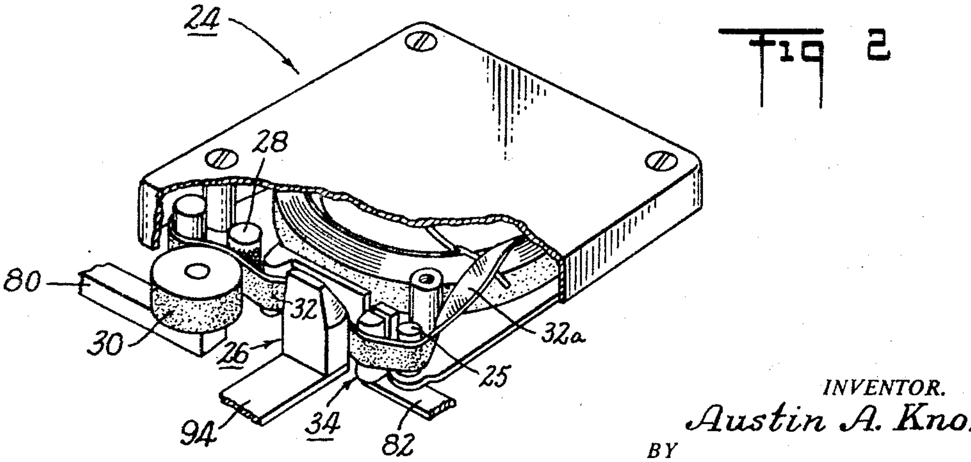
FIGURE 2 is a perspective view of a tape cartridge of my invention illustratively showing the relationship of the capstan, pinch roller, transducer head, and tape guide of my invention as they engage the cartridge tape loop.

As shown in FIGURES 2 and 3, a movable tape guide 34 engages the tape to guide it and urge it against the transducer 26. The tape guide 34 and transducer 26 are vertically movable relative to one another for the playing of multi-track tapes, as will be more fully explained hereinafter.

In operation the cartridge 24 is inserted into the tray 22 with the tray in its upper or dashed line position, as shown in FIGURE 4. The tray remains in the upper or disengaged position until the actuation of lever 36 from left to right, as seen in FIGURES 1 and 3. As lever 36 is moved from left to right the following sequence of events take place in the machine. When the cartridge is inserted fully into the tray, interlock assembly 38 (FIGURE 3) releases the tray as catch 37 is moved by actuating end 39 from under the tray corner to permit springs **22*b* to pull the tray downwardly into its solid line position shown in FIGURE 4 by actuation of release assembly 40. This positions tape loop 32 between capstan 28 and pinch roller 30 and between tape guide 34 and transducer 26. Further movement of the lever 36 from left to right causes the pinch roller 30 to move toward the capstan 28 from its dashed line position to its solid line position, as shown in FIGURE 3, thus engaging and resiliently pressing the tape loop 32 against capstan 28. The tape guide 34** is actuated by the same linkage and moves substantially forward into the tape, as shown in FIGURE 3, to pull the tape against the transducer head and to position the tape vertically with respect thereto.

A tray locking assembly 42 is also actuated by movement of lever 36 to firmly hold the tray down on the tape deck against shock and vibration. Just before the end of the left to right travel of lever 36, switches 44 and 46 (FIGURE 6) are closed to energize the capstan drive motor 48 and the sound amplifier and speaker circuits (not shown). Thus a movement of lever 36 from left to right drops the tray and tape cartridge into position over the capstan and tape guide and in front of the transducer and pinch roller, after which the tape guide and pinch roller engage the tape while the cartridge tray is locked onto the tape deck, after which the tape transport and sound reproducer systems are switched on.

The vertical positioning of the tape with respect to the transducer head is accomplished by control knob 50 by vertical movement of the transducers or the tape guide as will be more fully described hereinafter.

To stop the machine and retract the tape cartridge the lever 36 is moved from right to left, as seen in FIGURE 1, which in reverse order opens switches 44 and 46 (FIGURE 6) stopping the tape transport and opening the sound reproducing circuits. Further travel of lever 36 to the left disengages the pinch roller and tape guide from the tape and releases the cartridge tray lock assembly 42. To remove the cartridge all that need be done is to press downwardly on end **22*a* of the tray to again bring it up to its dashed line position, as shown in FIGURE 4. As the cartridge tray is again tilted to its upper position the tape loop 32 is lifted upwardly to clear the capstan and tape guide, and the cartridge can then be slidably removed from the tray 22**.

Figure 10:
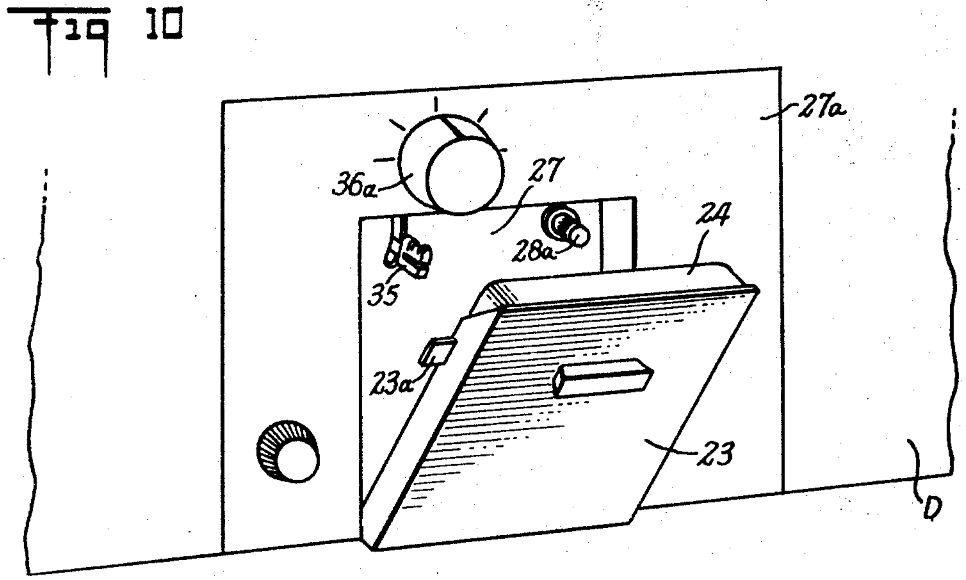
FIGURE 10 is an alternate embodiment of a tape recorder/reproducer of my invention wherein the cartridge may be played in a vertical position.
Figure 11:
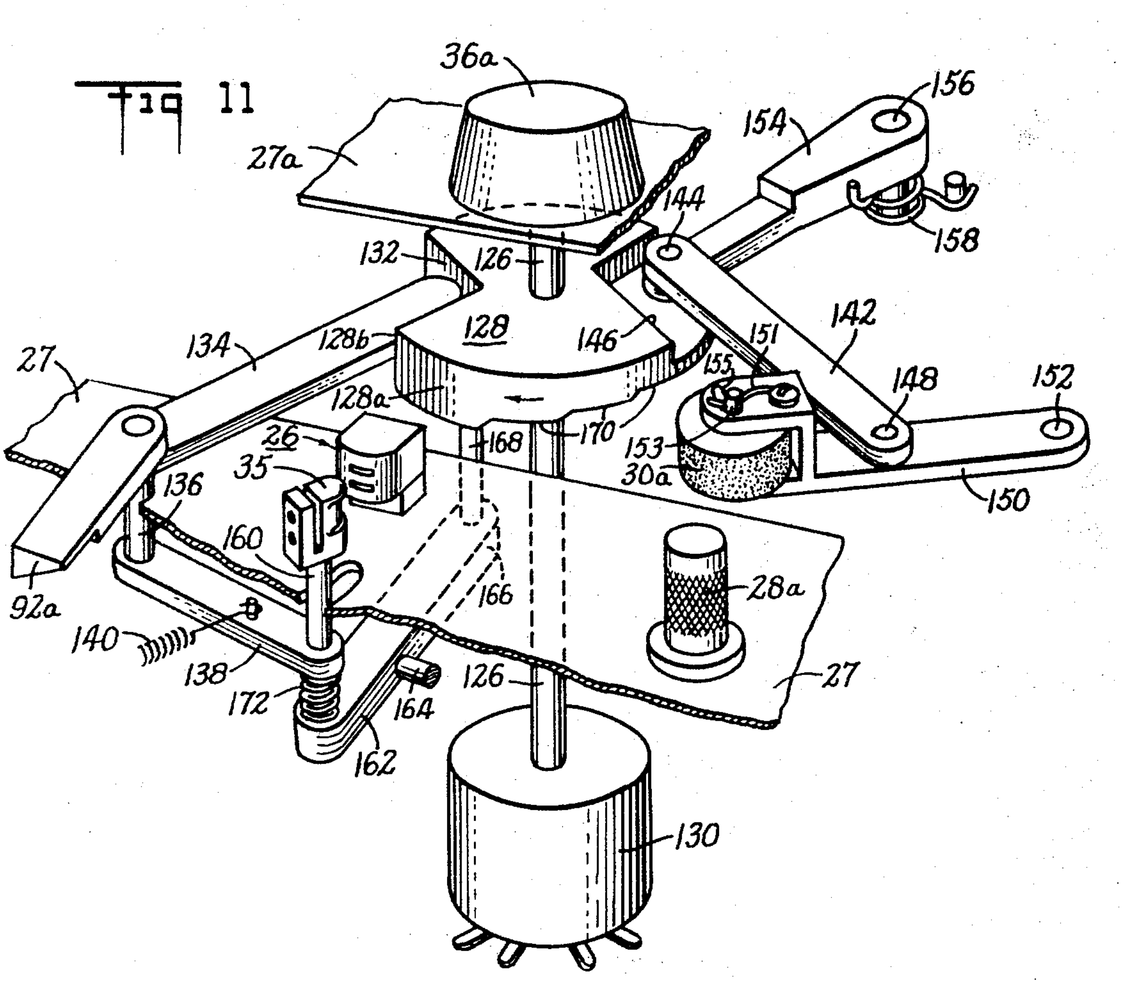
FIGURE 11 is a diagrammatic perspective view partially broken away of the control linkage of the embodiment of FIGURE 10.

Although in the embodiment shown in FIGURES 1–4 the cartridge tray 22 is held in a horizontal position the cartridge may be played in other positions, such as a vertical position as shown in FIGURES 10 and 11. In such an application wherein the tape transport is in an automobile, for example, the tape deck plate is placed in a vertical position for playing, the tray being hinged at the bottom with the cartridge and tape loop being moved into playing position when the tray is closed into the automobile dashboard.

While not limited to such an embodiment, the tape transport control system as shown in FIGURE 11 comprises a single knob control **36*a* for moving the tape guide 35 and pinch roller 30*a* into engagement with the tape while synchronizing switching through shaft 126 and switch 130. Rotation of knob 36*a* may also operate as a recording track selector by varying the position of tape guide 35 across transducer 26** as is more fully set forth hereinafter.

Figure 6:
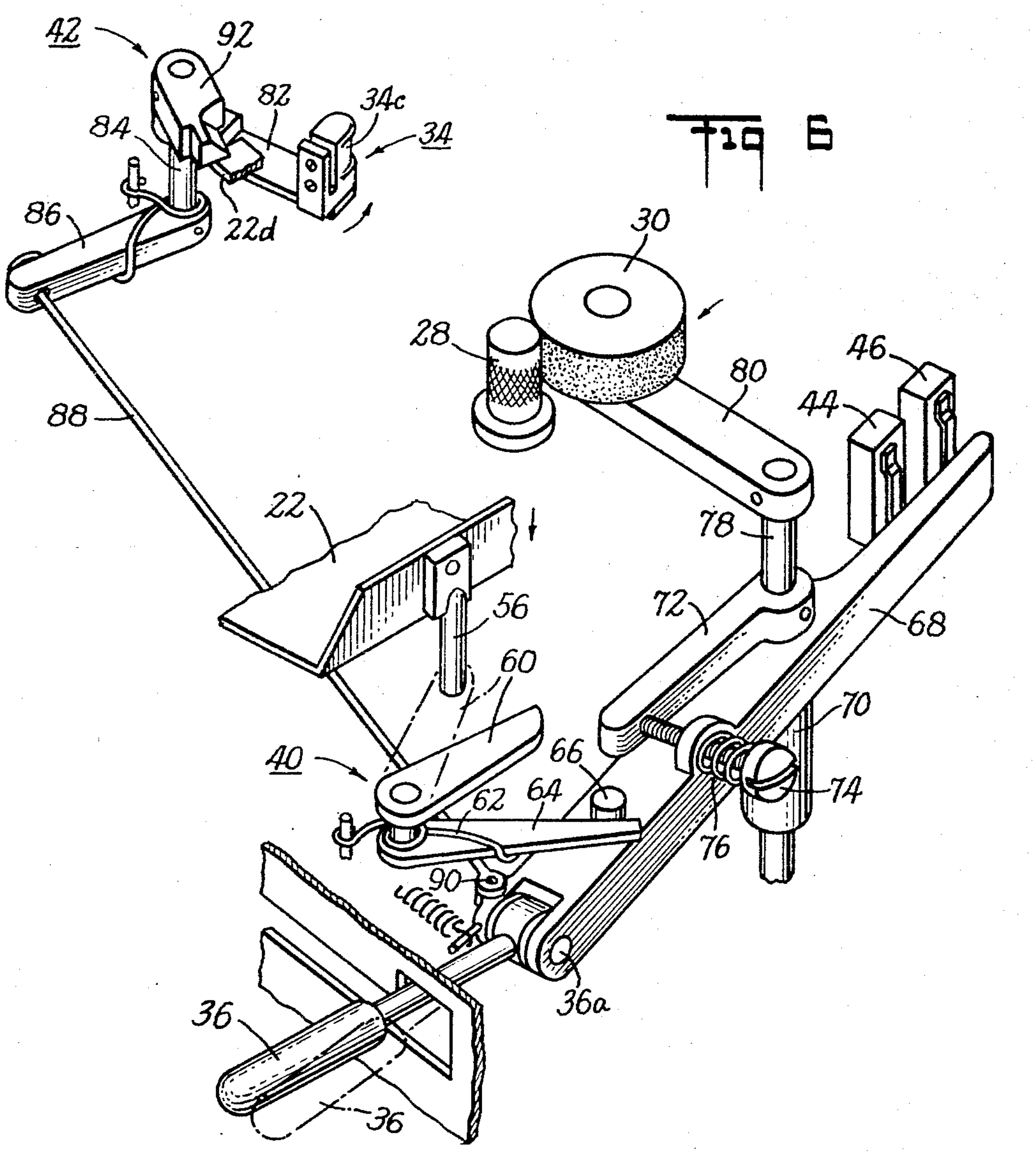
FIGURE 6 is a diagrammatic perspective view illustrating the actuating mechanism and linkage of my recorder/reproducer for engaging the cartridge tape loop.

As shown in FIGURES 3, 4, and 6, the tray 22 is secured by a hinge 52 (FIGURE 4) to the tape deck plate 54 and is held in a raised position by pin 56 secured to the tray side above opening 58 in the plate deck 54. To maintain the tray in its upper position an engaging slide 60 is positioned on top of the tape deck and is urged over the opening 58 by spring 62 engaging operating arm 64 (FIGURE 6). Operating arm 64 is urged in a clockwise direction by lug 66 on control bar 68 which is moved about its pivot mounting 70 by lever 36 which is hingedly secured at **36*a* to the control bar 68. Thus, movement of the lever 36 from left to right rotates slide 60 to move it from under pin 56 permitting the tray 22 to be urged to its lower position by springs 22*b*, *c*, dropping tape loop when the cartridge tray is again tilted upwardly by downward pressure on end 22***a* the slide 60 is again urged under the pin 56 to retain the tray in its upper position.

As shown in FIGURES 2 and 4, the capstan 28 is positioned within the tape cartridge on the inside of the tape loop 32. In its full line down position the tape loop is also positioned in front of tape guide 34 and transducer 26.

The release of pin 56 and the dropping of the tray to its lower position takes place in the first portion of the travel of lever 36 from left to right since the tray must be in a down position before the engagement of the tape by the tape guide 34 and pinch roller 30.

As best seen in FIGURES 3 and 6, further travel of the control lever 36 and its attached control bar 68 from left to right then actuates the tape guide 34 and pinch roller 30 for engagement with the tape which has had its tape loop 32 loosely positioned between the retracted pinch roller (dashed line position in FIGURE 3) and the retracted tape guide (dashed line position in FIGURE 3). The pinch roller is urged into engagement with the tape to press it against the capstan 28 through arm 72 which is secured to control bar 68 by adjusting screw 74 which is threaded into the arm 72 and has a pressure spring 76 biasing the pinch roller 30 toward the capstan 28 through pivot pin 78 and mounting arm 80. Thus the capstan is moved and urged into engagement with the tape loop in an arcuate path with the pinch roller axis remaining parallel to the capstan axis at all times, to assure even tape pressure from top to bottom during tape transport operation.

As the pinch roller is moved into engagement with the tape the tape guide is also pivotally moved into engagement with the tape through its mounting arm 82 through pivot pin 84 which is secured to operating arm 86 which in turn is rotated counterclockwise (FIGURE 6) by link 88 which is pivotally secured at 90 to the control bar 68. Operating arm 86 also rotates the cam member 92 of the tray locking assembly 42 to force it over tray tap 22*d* (FIGURE 3) on the front corner of the tray to lock the tray in its down position when the tape cartridge is in a playing mode.

After the tape cartridge tray 22 is dropped to its lower position and the tape guide and pinch roller engage the tape with the tray locking assembly holding the tray in its down position, the switches 44, 46 are then closed near the end of the left to right travel of lever 36 to energize the capstan motor and the transducer and amplifier circuitry.

As best seen in FIGURES 2, 3 and 4, the tape loop 32 is readily dropped into position between the pinch roller 30 and the capstan 28 and between the tape guide 34 and the transducer 26 when the pinch roller and tape guide are in their retracted, dashed line position, as shown in FIGURE 3. To facilitate initial positioning of the tape the transducer preferably has a sloped upper extension portion 26*a* to guide the tape downwardly in front of the transducer when the cartridge tray is dropped to its lower position.

Figure 5:
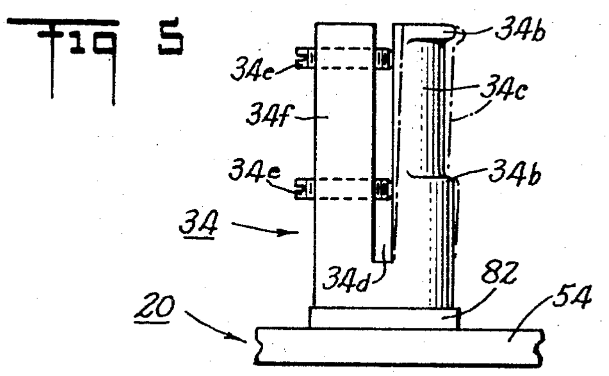
FIGURE 5 is a fragmentary side view showing the compensating tape guide of my invention taken along lines 5—5 of FIGURE 3.

As shown in FIGURE 5, the tape guide 34 is provided with tape positioning shoulders 34*b* with the surface 34*c* slidably engaging the tape. The guide 34 is preferably split at 34*d* and has one or more adjusting screws 34*e* threaded into the rear portion 34*f* and bearing against the front portion of the tape guide to change the angle of surface 34*c*, as shown in dashed lines in FIGURE 5. This angular change of the tape guide surface 34*c* compensates for the twisting of the tape in the cartridge, as seen in FIGURE 2 at 32*a*. With the tape being twisted to lie flat under the cartridge cover, there is a difference in travel from one edge of the tape to the other as it passes from the cartridge hub to be presented to the transducer. Unless this is compensated for, one edge of the tape will be pulled with more tension than the other, resulting in distortion and head to tape pressure variations at points across the width of the tape. The adjustability of the tape positioning surface 34*c* permits the compensated tape guide to be adjusted for playing tape cartridges having varying characteristics. If the tape cartridge has a tilted compensating corner post 25 (FIGURE 2), for example, tape guide surface 34*c* may be substantially vertical since the tape twist compensation may be provided for in the cartridge itself.

Figures 7, 8, 9:
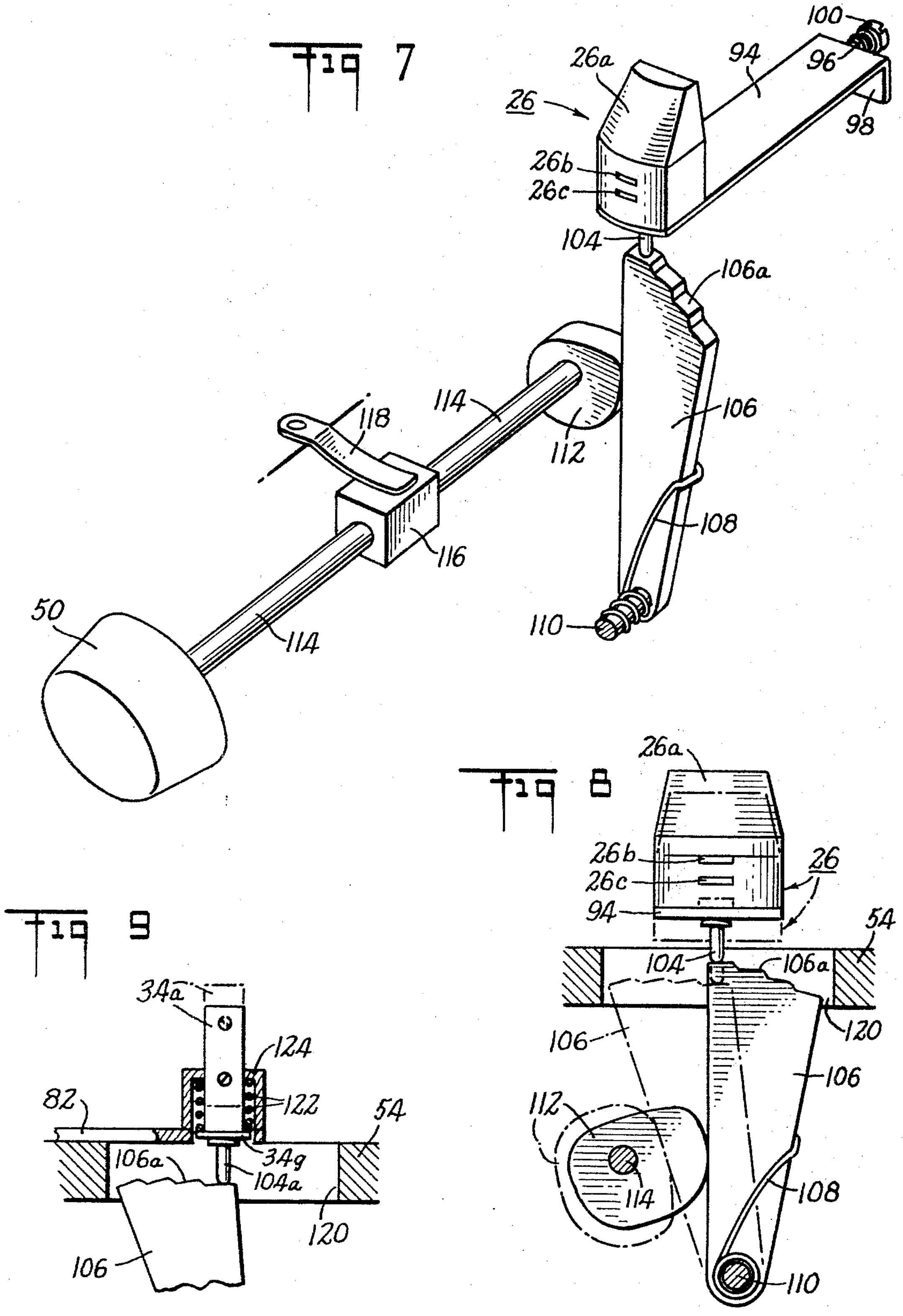
FIGURE 7 is a partial diagrammatic perspective view of the transducer head positioning mechanism for the recorder/reproducer of my invention.
FIGURE 8 is a fragmentary end view of the transducer head positioning mechanism of the recorder/reproducer shown in FIGURE 7.
FIGURE 9 is a fragmentary view in partial section of an alternate embodiment wherein the tape guide may be vertically positioned to move the tape relative to the transducer head.

Referring now to FIGURES 7 and 8, the transducer positioning mechanism will be described. For playing multi-track tapes the transducer assembly 26 preferably has two pickup heads 26*b* and *c* for playing stereo tapes. With appropriate electrical switching each single head 26*b* and *c* may also be positioned to pickup from a single or monaural track on the tape. The transducer 26 is mounted on a pivot plate 94 which is urged downwardly by spring 96 bearing against a downwardly depending flange 98 and against adjusting screw 100 which is secured into a rear edge 102 of tape deck 54, (FIGURES 3 and 4). A cam follower 104 below the transducer 26 rides on a long, stepped cam follower 106 having four steps on its upper surface 106*a*. Cam follower 106 is urged in a counterclockwise direction by spring 108 about its pivot pin 110. Cam follower 106 is thus urged against the four-position cam 112 which is secured to control shaft 114 which is secured to positioning block 116. Block 116 is maintained in one of four positions by a leaf spring 118 which permits rotation of shaft 114 by control knob 50 to any one of four positions.

As shown in FIGURE 8, the transducer 26 may be moved vertically to any one of four positions by rotation of cam 112 against cam follower 106 to arcuately move the follower 106 within opening 120 of tape deck plate 54. The long radius from the center of pivot pin 110 to the top stepped surface 106*a* of follower 106 reduces the critical tolerance requirements for the machining of cam 112 and follower 106 while providing for accurate positioning of the transducer heads with respect to the tape tracks. The amount of vertical movement and positioning of the transducer heads is somewhat critical since there may be eight tracks on a one-quarter inch wide tape. The heads 26*b* and *c* may have a width of about .020 of an inch, with the tape tracks spaced apart from center to center a distance of about .013 of an inch. The use of a long radius cam follower 106 provides precise vertical positioning of the transducer in four positions and yet is relatively inexpensive to machine.

Referring now to FIGURE 9, an alternate embodiment for positioning the tape with respect to the transducer head is shown wherein the tape guide 34*a* may be vertically positioned in the same manner while the transducer is fixed. This embodiment is preferred for use in automobiles, for example, because the mass of the tape guide is substantially less than that of the transducer and accordingly is not effected as much by vibration or shock. As shown in FIGURE 9, the tape guide 34*a* has a lower shoulder 34*g* engaging a spring 122 which bears against the upper part of housing 124 to urge the tape guide downwardly. A vertical cam follower pin 104*a* is secured to the underside of the tape guide and rests upon the upper stepped surface 106*a* of cam follower 106. Thus, as seen in FIGURE 9, as cam follower 106 is rotated in a clockwise direction the tape guide can be positioned at any of four vertical levels as the follower pin 104*a* rests upon one of the four steps of surface 106*a*. In this embodiment with the transducer head fixed in position the position of the tape guide will determine the tracking of the transducer head or heads on the tape.

The embodiment shown in FIGURES 10–11 will now be described more specifically. As shown in FIGURE 10, the cartridge tray 23 is hinged at its bottom and is tilted outwardly to receive a tape cartridge 24. The embodiment shown may be an integral part of an automobile dashboard D. With the cartridge thus inserted in the tray, the tray is tilted forwardly to place the cartridge adjacent tape deck 27 with the tape loop over the tape guide 35 and the capstan 28*a*, the tray 23 then being substantially flush with cover portion 27*a*. The control knob 36*a* on the front of the machine is then rotated and by means of a control linkage moves the tape guide to pull the tape into contact with the transducer head and moves the pinch roller toward the capstan for driving engagement of the tape by the capstan. Further rotation of the control knob 36*a* then initiates movement of the tape in the tape transport by energizing the capstan motor. Still further rotation of control knob 36*a* provides for channel selection by movement of the tape guide relative to the transducer head as will be more fully explained hereinafter.

Referring now to FIGURE 11, it will be seen that the control knob 36*a* is secured through a rotatable shaft 126 to operate cam disk 128 and multiple switch 130. Cam disk 128 is provided with a first detent 132 for accommodating actuating arm 134 which is supported by a pivot 136 to operate tray locking cam 92*a* secured thereto and connecting arm 138 which moves the tape guide 35 into engaging position. The connecting arm 138 is urged to the tape-disengaged position by a spring 140 secured thereto, which in turn urges actuating arm 134 into detent 132 and against the peripheral side 128*a* of the circular cam 128. Thus rotation of cam 128 in a clockwise direction moves the actuating arm 134 by engagement of edge 128*b* and continuing engagement of the circular side 128*a* to lock the tray into a closed position by engagement of tab 23*a* (FIGURE 10) by locking cam 92*a* and moves the tape guide 35 toward the tape loop for engagement with the transducer head.

Engaging the opposite peripheral side of cam 128 is a link 142 which is pivotally secured at 144 to idler arm 154, the pivotally secured ends both extending into a recess 146 on cam 128. The other end of link 142 is pivotally secured at 148 to bifurcated arm 150 which rotatably carries the pinch roller 30*a* at one end and which is pivotally secured at 152 at its other end. A spring 151 urges the pinch roller toward capstan 28*a* as it bears against pinch roller shaft 153 in its slotted journal 155. A similar spring also bears against the lower end of shaft 153. Thus clockwise rotation of cam 128 also causes the pinch roller 30*a* to be moved toward the capstan 28*a* through link 142 for driving engagement of the tape against the capstan. Idler arm 154 is pivotally secured at its other end to a pivot pin 156 and is urged by a spring 158 toward cam 128 which moves pinch roller 30*a* away from capstan 28*a* when cam 128 is in the position shown in FIGURE 11.

Still referring to FIGURE 11, it will be seen that tape guide 35 is vertically supported on shaft 160 which bears against lever 162 pivoted at 164 with end 166 having a cam follower 168 riding on the stepped underside of cam 128. The underside of cam 128 has four distinct levels 170 for positioning the tape guide vertically with rotation of control knob 36*a*. A spring 172 around pin 160 urges cam follower 168 into contact with the step cam surfaces 170. Rotation of control knob 36*a* varies the position of the tape guide to provide channel selection as the tape is positioned with respect to transducer head assembly 26.

In conjunction with the operation of control knob 36*a* the multiple switch 130 provides power to the capstan 28*a* after the clockwise rotation of control knob 36*a* has caused engagement of the tape by tape guide 35 and the pinch roller 30*a* through their respective linkages. Further, clockwise rotation of control knob 36*a* may then also effect electrical switching of channels of a multi-head transducer assembly in coordination with the positioning of the tape guide 35 across the face of transducer assembly 26. As will be noted, movement of tape guide and pinch roller toward or away from the transducer assembly and capstan respectively is not changed by such further channel-selecting rotation of cam 128.

It should be understood that in either embodiment the tape cartridge may be played in any position in which the machine is oriented. The tape transport in both embodiments is designed so that the capstan drives the tape on the inside of the tape loop, entering when the cartridge tray is moved to the tape deck. Thus the tape is driven on its non-oxide side and tape wear is greatly reduced. Further, a much higher quality pinch roller can be employed in the machine, since an individual pinch roller does not have to be provided for each cartridge. The engagement of the tape by the tape guide and the pinch roller in both embodiments is accomplished by a single control through mechanical linkages which are positive in their action and reliable in operation. Further, the mechanical interlock assembly 38 assures the full insertion of the cartridge into the tray before the tray is moved toward and on to the tape deck. Although not shown in FIGURES 10 and 11, it should be understood that a similar mechanical interlock is provided in the FIGURE 10 embodiment to permit closure of the cartridge tray onto the tape deck 27 only when the cartridge is fully inserted.

My compensating tape guide may also be employed with either embodiment as shown.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the disclosure herein is intended to cover all of the generic and specific features of the invention herein described, and all statements of the scope of the invention, which as a matter of language, might be said to fall therebetween.

Having described my invention, what I claim as new and desire to secure by Letters Patent is:

1. In a tape recorder/reproducer for a continuous loop tape cartridge the combination of (A) a transducer;
(B) a tape guide adjacent said transducer;
(C) a drive capstan
  (1) having a free open end,
  (2) the other end being engaged with drive means;
(D) a pinch roller adjacent said capstan,
  (1) and movable toward and away from said capstan,
  (2) with the axes of said capstan and said pinch roller maintaining a substantially parallel relationship;
(E) a tape deck supporting said transducer, said tape guide and said drive capstan;
(F) a tray for receiving and holding a tape cartridge having a loop of recording tape,
  (1) said tray being mounted for movement toward and away from said tape deck with said tape loop end adjacent said transducer and said capstan, and
(G) interlock means for permitting movement of said tray only when said tape cartridge is fully inserted therein comprising:
  (1) a catch engaging and holding said tray away from said tape deck,
  (2) and actuator means engaging said catch for releasing said tray only when said cartridge is fully inserted therein, whereby said loop of recording tape on said cartridge is positioned adjacent said transducer and between said capstan and said pinch roller when said tray is moved to said tape deck and said cartridge may be inserted or removed from said tray when said tray is moved away from said tape deck.

2. A tape recorder/reproducer as defined in claim 1 wherein there is provided (H) means for positioning said transducer relative to said tape guide comprising rotatable cam means having
  (1) a stepped cam surface along a side thereof and
  (2) a cam follower on one of said transducer and said tape guide, and engaging said cam surfaces.

3. A tape recorder/reproducer as defined in claim 2 wherein (I) said means for positioning said transducer and said tape guide relative to one another comprises, (1) a first rotatable cam, (2) a first cam follower engaging said cam through an arc having a substantial radius, (a) said first cam follower having a stepped cam surface thereon, (3) and second cam follower means on one of said transducer and said tape guide for engaging said stepped cam surface to move and position one of said transducer and said tape guide relative to the other.

4. A tape recorder/reproducer as defined in claim 2 wherein there is provided (I) means for actuating said pinch roller and said tape guide and (J) said means for positioning one of said transducer and said tape guide relative to the other comprises, (1) a rotatable cam member having cam surfaces, (a) on the underside, and (b) around the periphery thereof, (2) a tape guide cam follower engaging the periphery of said cam member and, (a) linkage means connecting said tape guide cam follower to said tape guide for moving said tape guide toward and away from said transducer, (3) a pinch roller cam follower engaging the periphery of said cam member and (a) linkage means connecting said pinch roller cam follower to said pinch roller for moving said pinch roller toward and away from said capstan, and (4) a cam follower pin engaging the underside of said cam member, and (a) linkage means connecting said pin to said tape guide for moving said tape guide normal to the path of tape movement.

5. A tape recorder/reproducer as defined in claim 3 wherein there is provided electrical switch means connected to said rotatable cam for synchronous operation therewith and said transducer is provided with a plurality of pickup heads, said switch means being operably connected with said pickup heads for selecting recorded tracks on a tape as the tape is positioned with respect to said heads.

6. A tape recorder/reproducer as defined in claim 4 wherein said rotatable cam member is rotated by a control shaft having multiple position switch means thereon, said switch means being synchronized with the actuation of said tape guide and said pinch roller by said rotatable cam for energizing said capstan only after engagement of the tape by said tape guide and said capstan.

7. A tape recorder/reproducer as defined in claim 1 wherein said tray is pivotally mounted at its end furthest from said transducer and said drive capstan for movement of said tape loop toward and away from said tape deck by tilting said tray and wherein there is provided means for holding said tray in one of two positions with respect to said tape deck, an upper tape-disengaging position and a lower tape-engaging position.

References Cited

UNITED STATES PATENTS

| | | | |
|---|---|---|---|
| 3,271,034 | 9/1966 | Andrews | 274—11 |
| 3,190,970 | 6/1965 | Atsumi. | |
| 3,043,531 | 6/1962 | Sinkewitsch | 242—76 |
| 2,894,702 | 7/1959 | Heath et al. | 242—76 |

FOREIGN PATENTS

| | | |
|---|---|---|
| 1,128,165 | 4/1962 | Germany. |
| 1,147,545 | 11/1957 | France. |

ROBERT B. HULL, *Primary Examiner.*

R. A. FIELDS, *Assistant Examiner.*

U.S. Cl. X.R.

179—100.2